United States Patent
Dunlay et al.

(10) Patent No.: US 11,420,764 B1
(45) Date of Patent: Aug. 23, 2022

(54) TOUCHSCREEN FUEL PANEL WITH CHECKLIST AUTOMATION

(71) Applicant: Rockwell Collins, Inc., Cedar Rapids, IA (US)

(72) Inventors: Angela N. Dunlay, Marion, IA (US); Steven L. Kamada, Cedar Rapids, IA (US); Phillip J. Hamm, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 159 days.

(21) Appl. No.: 16/592,118

(22) Filed: Oct. 3, 2019

Related U.S. Application Data

(60) Provisional application No. 62/767,306, filed on Nov. 14, 2018.

(51) Int. Cl.
| | |
|---|---|
| *G06F 3/048* | (2013.01) |
| *B64D 43/00* | (2006.01) |
| *B64D 37/00* | (2006.01) |
| *G06T 13/80* | (2011.01) |
| *G06F 3/0482* | (2013.01) |
| *G06F 3/04883* | (2022.01) |

(52) U.S. Cl.
CPC ........... *B64D 43/00* (2013.01); *B64D 37/005* (2013.01); *G06F 3/0482* (2013.01); *G06F 3/04883* (2013.01); *G06T 13/80* (2013.01)

(58) Field of Classification Search
CPC ...... B64D 43/00; B64D 37/005; G06T 13/80; G06F 3/04883; G06F 3/0482
See application file for complete search history.

(56) References Cited

U.S. PATENT DOCUMENTS

| | | | |
|---|---|---|---|
| 9,772,712 B2 | 9/2017 | Kneuper et al. | |
| 2009/0300543 A1* | 12/2009 | Mower | G06F 9/451 |
| | | | 715/809 |
| 2010/0312420 A1* | 12/2010 | Sham | B64F 5/60 |
| | | | 701/3 |
| 2012/0226424 A1* | 9/2012 | Adams | G01L 3/26 |
| | | | 701/93 |
| 2014/0189520 A1* | 7/2014 | Crepps | G06F 3/0484 |
| | | | 715/738 |
| 2015/0261379 A1* | 9/2015 | Kneuper | G08G 5/0052 |
| | | | 345/173 |
| 2016/0216849 A1* | 7/2016 | Kawalkar | G06F 3/04895 |
| 2017/0088285 A1* | 3/2017 | Wischmeyer | G08G 5/0065 |
| 2017/0210484 A1* | 7/2017 | Figard | B64D 45/00 |
| 2018/0292953 A1 | 10/2018 | Pandya et al. | |

* cited by examiner

Primary Examiner — Aleksey Olshannikov
(74) Attorney, Agent, or Firm — Suiter Swantz pc llo

(57) ABSTRACT

A touchscreen fuel panel with checklist automation is disclosed. In embodiments, the fuel panel includes a touchscreen display and a controller coupled to the touchscreen display. The controller is configured to generate a graphical user interface at the touchscreen display and receive user inputs via the touchscreen display. The controller is further configured to execute an automated set of fuel management checklist procedures in response to a user input. In some embodiments, the controller can be alternatively or additionally configured to execute other automated sets of checklist procedures, for example, pre-flight, in-flight, taxi/take-off/landing (TTL), and/or post-flight procedures.

8 Claims, 11 Drawing Sheets

TOUCHSCREEN FUEL PANEL WITH CHECKLIST AUTOMATION

PRIORITY

The present application claims the benefit under 35 U.S.C. § 119(e) of U.S. Provisional App. No. 62/767,306 (filed Nov. 14, 2018), which is incorporated herein by reference.

GOVERNMENT LICENSE RIGHTS

The U.S. Government has a paid-up license in this invention and the right in limited circumstances to require the patent owner to license others on reasonable terms as provided by the terms of FA8105-11-D-0001 awarded by the United States Air Force.

BACKGROUND

Currently employed fuel panels rely on hard switches and digital readouts to manage and monitor fuel in aircrafts. Flight crew must manually perform control operations and critical calculations. Improved fuel panels are needed in order to reduce human error, relieve flight crew of tasks that can be handled automatically, and provide flight crew with better access to information.

SUMMARY

In one aspect, embodiments of the inventive concepts disclosed herein are directed to a touchscreen fuel panel that enables checklist automation. In embodiments, the fuel panel includes a touchscreen display and a controller coupled to the touchscreen display. The controller is configured to generate a graphical user interface at the touchscreen display and receive user inputs via the touchscreen display. The controller is further configured to execute an automated set of fuel management checklist procedures in response to a user input. In some embodiments, the controller can be alternatively or additionally configured to execute other automated sets of checklist procedures, for example, pre-flight, in-flight, taxi/takeoff/landing (TTL), and/or post-flight procedures.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
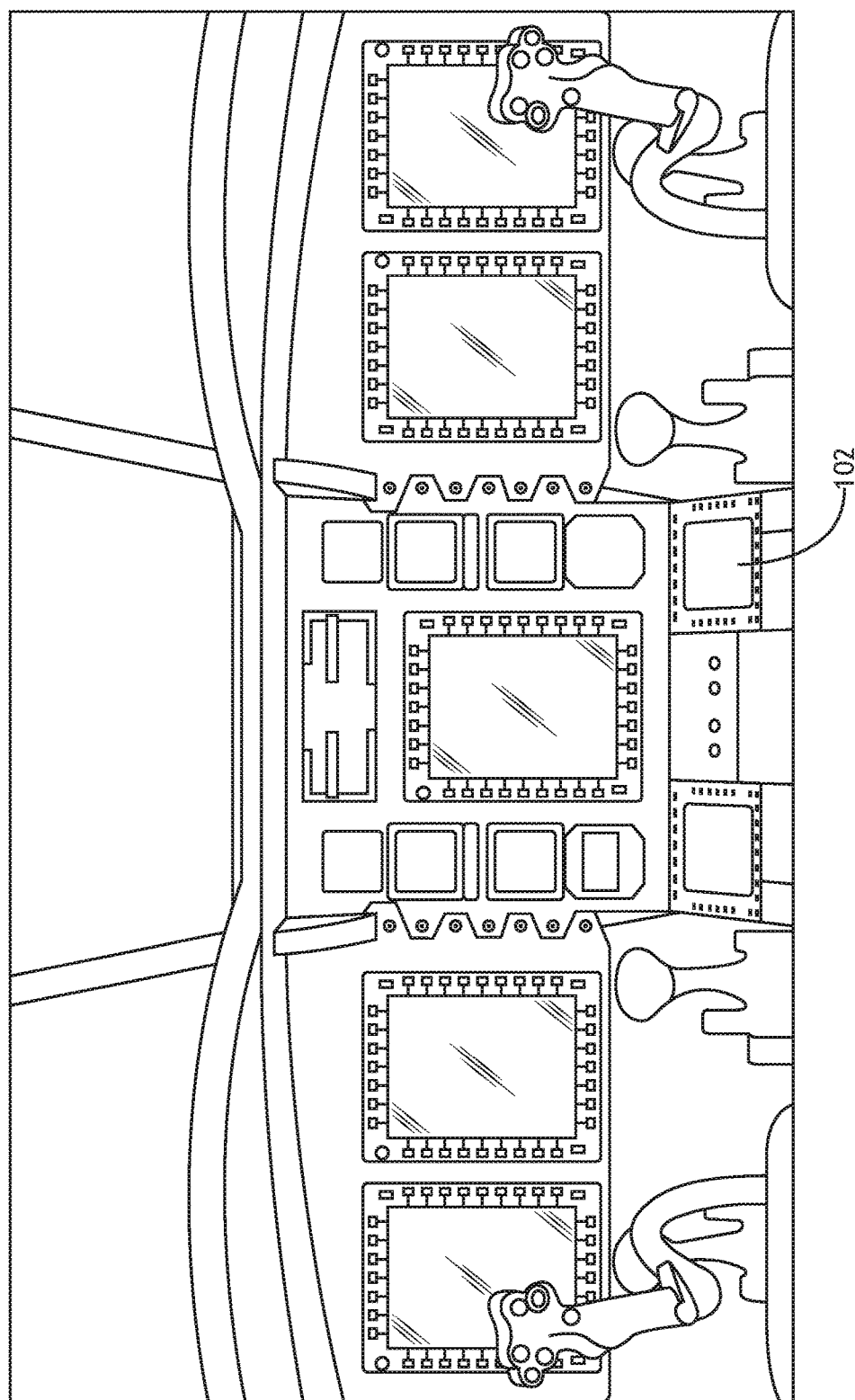
FIG. 1 shows an environmental view of an aircraft cockpit including an exemplary embodiment of a touchscreen fuel panel.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a touchscreen fuel panel that enables checklist automation. In embodiments, the fuel panel includes a touchscreen display and a controller coupled to the touchscreen display. The controller is configured to generate a graphical user interface at the touchscreen display and receive user inputs via the touchscreen display. The controller is further configured to execute an automated set of fuel management checklist procedures in response to a user input. In some embodiments, the controller can be alternatively or additionally configured to execute other automated sets of checklist procedures, for example, pre-flight, in-flight, taxi/takeoff/landing (TTL), and/or post-flight procedures.

Referring to FIG. 1, an environmental view of an aircraft cockpit 100 including an exemplary embodiment of a touchscreen fuel panel 102 is shown. Existing aircraft environments include hard switches (e.g., toggles, knobs, flip switches, slide switches, etc.) for managing fuel in the aircraft. A touchscreen fuel panel 102 replaces existing hard switches, and is integrated within the center console or elsewhere in the aircraft environment so that it is conveniently accessible to flight crew.

Figure 2:
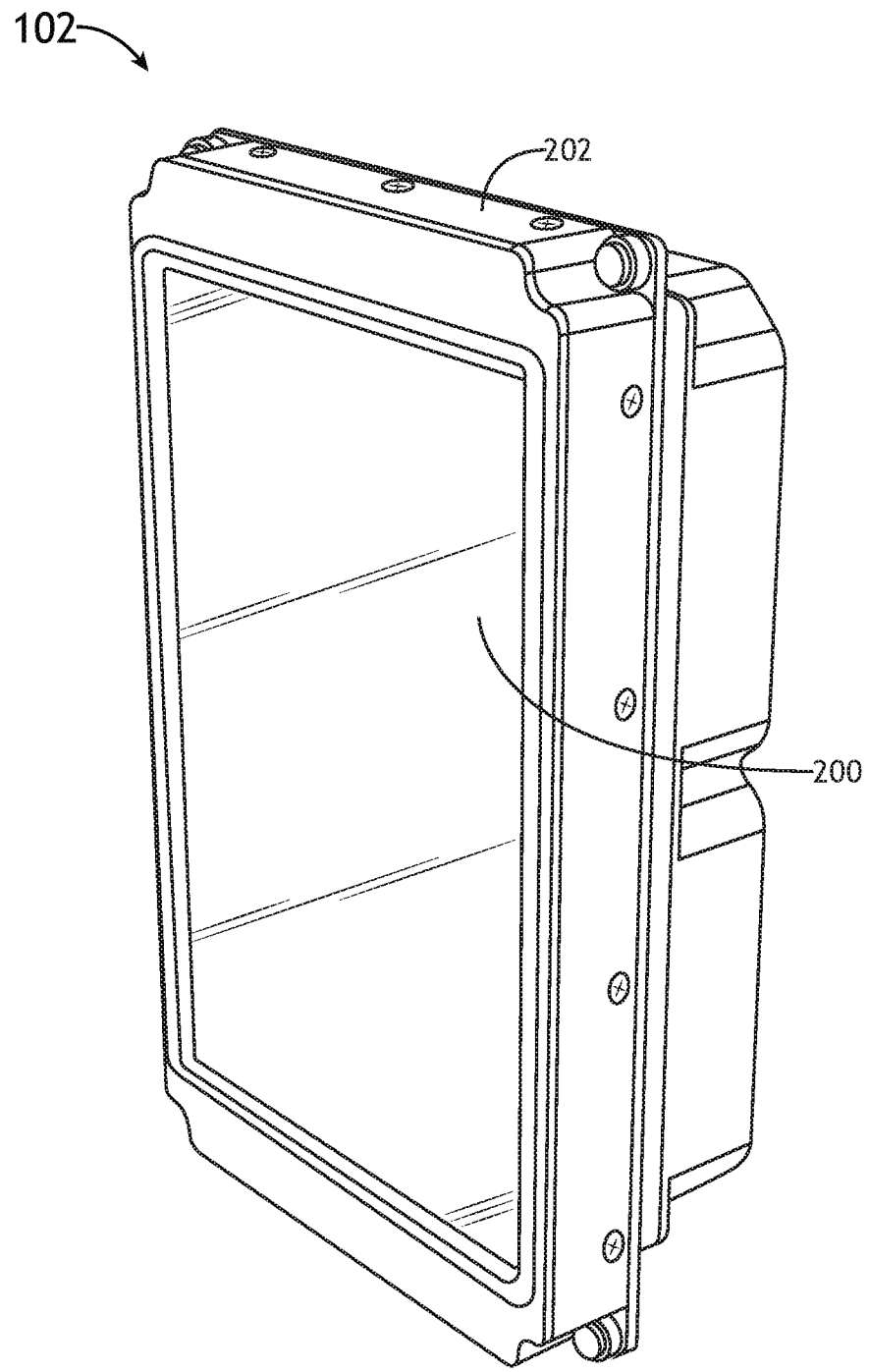
FIG. 2 shows a perspective view of a touchscreen fuel panel according to an exemplary embodiment.

Referring to FIG. 2, a perspective view of a touchscreen fuel panel 102 according to an exemplary embodiment is shown. The touchscreen fuel panel 102 is a self-contained device in data communication with other on-board avionics systems to receive and display data on a touchscreen display 200. The touchscreen display 200 allows users to interact with the connected systems such as through the automated execution of stored checklists. The touchscreen fuel panel 102 includes an enclosure 202 that holds, carries, and/or is coupled to various electronic components of the touchscreen fuel panel 102. For example, the enclosure 202 can hold, carry, and/or be coupled with a touchscreen display 200, a controller or processor, memory, and one or more communication interface ports.

Figure 3:
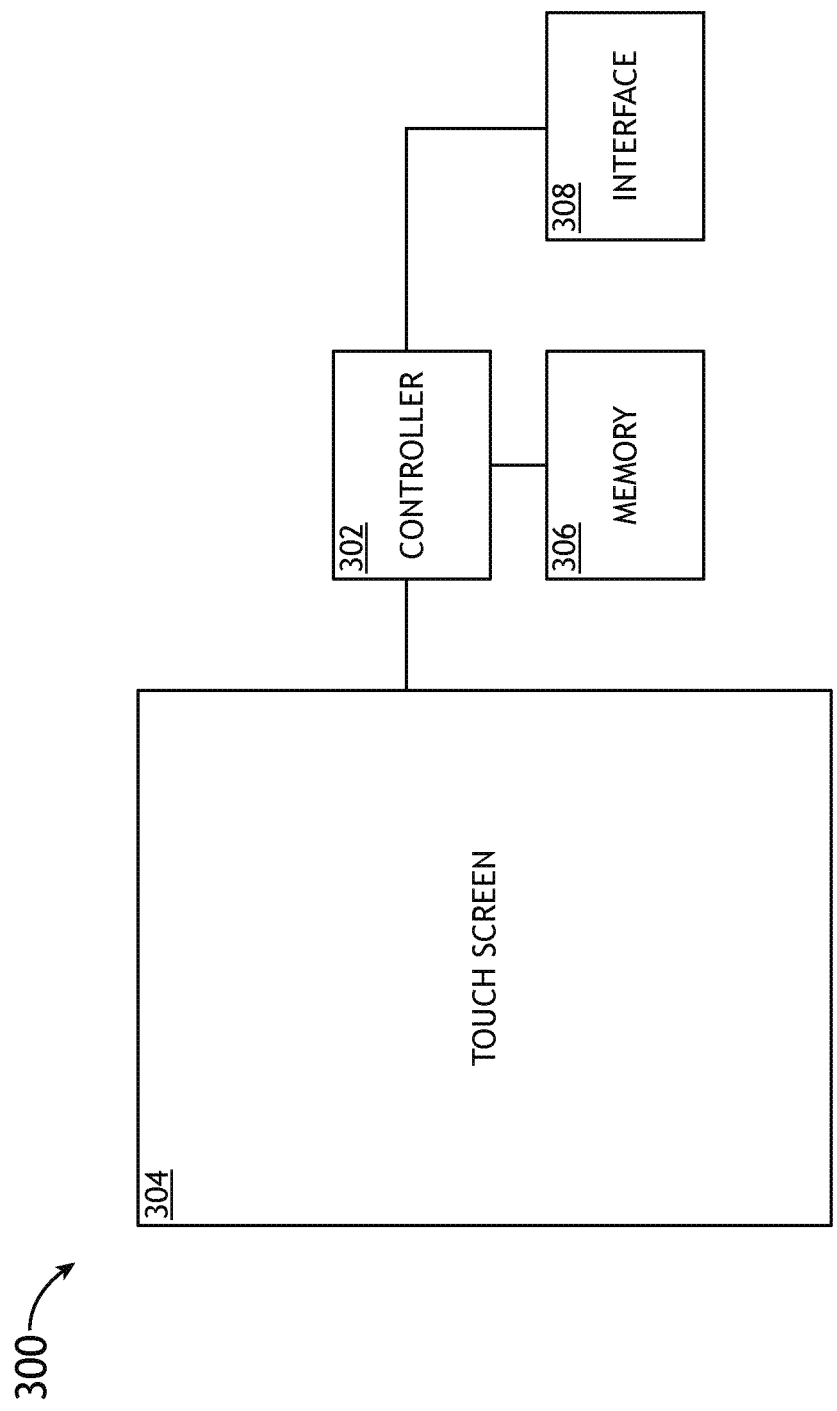
FIG. 3 shows a block diagram of a system for implementing a touchscreen fuel panel according to an example embodiment.
Figure 4A:
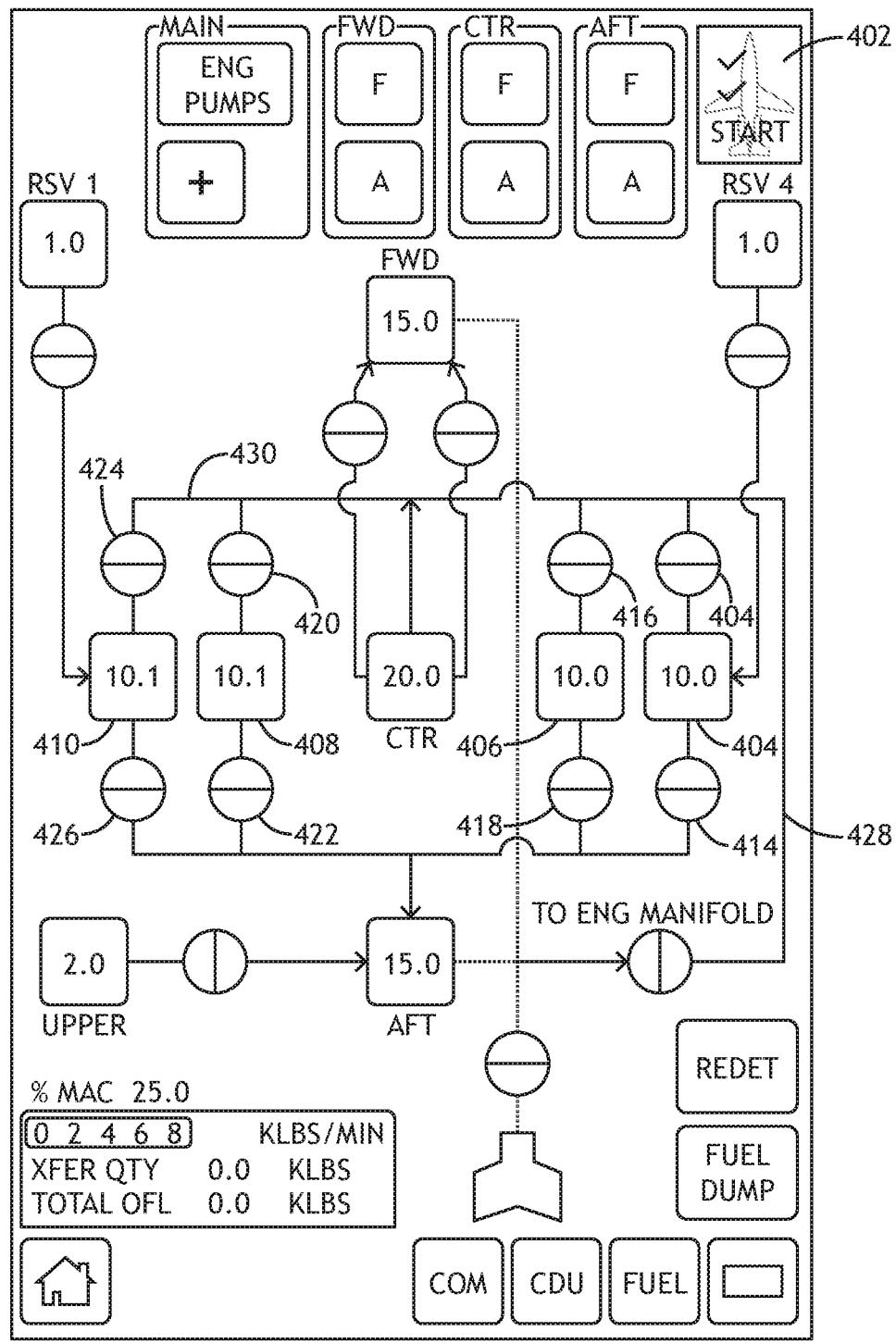
FIG. 4A shows a screen displayed by a touch screen fuel panel during a sequence according to an exemplary embodiment.
Figure 4B:
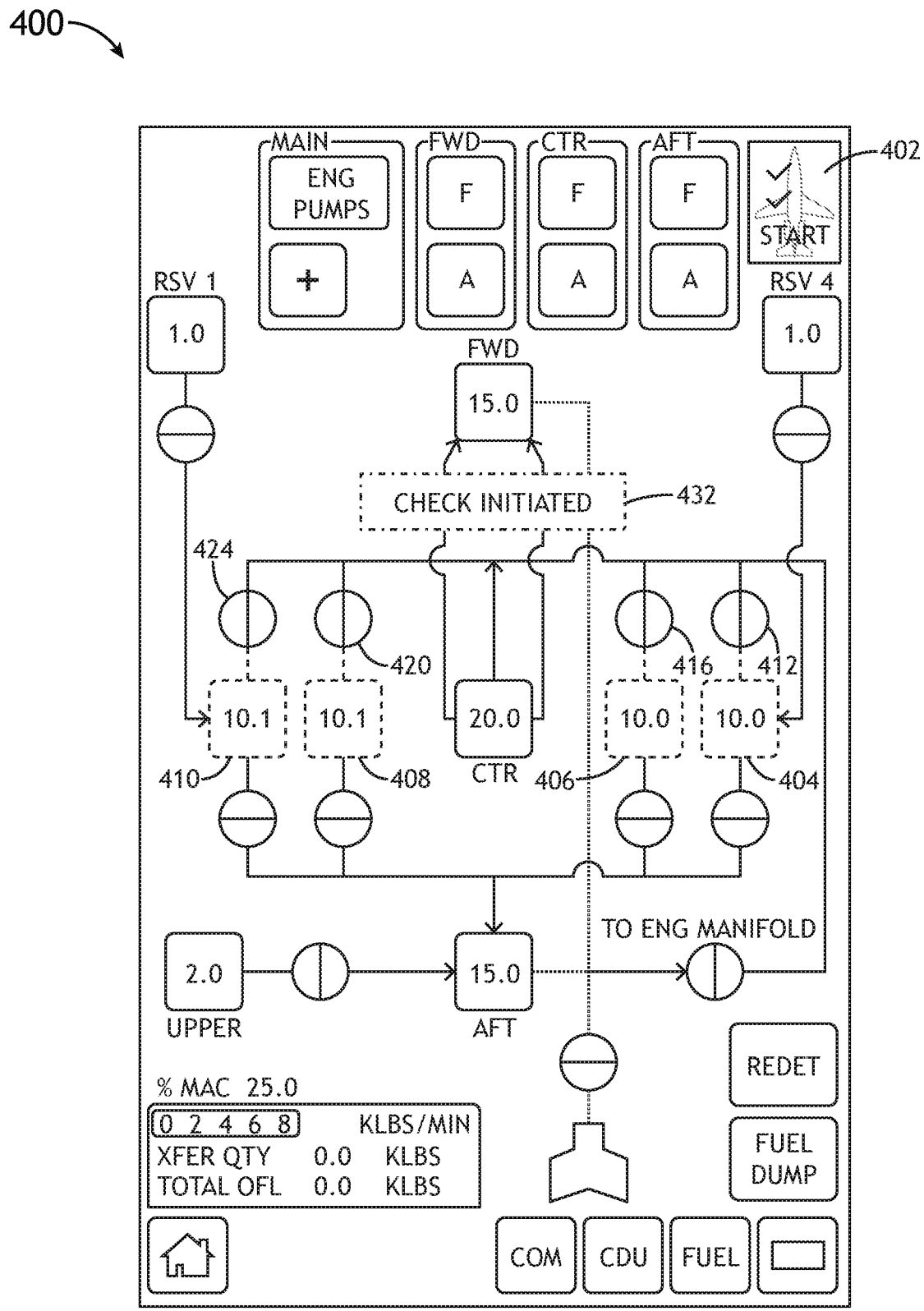
FIG. 4B shows a screen displayed by a touch screen fuel panel during a sequence according to an exemplary embodiment.
Figure 4C:
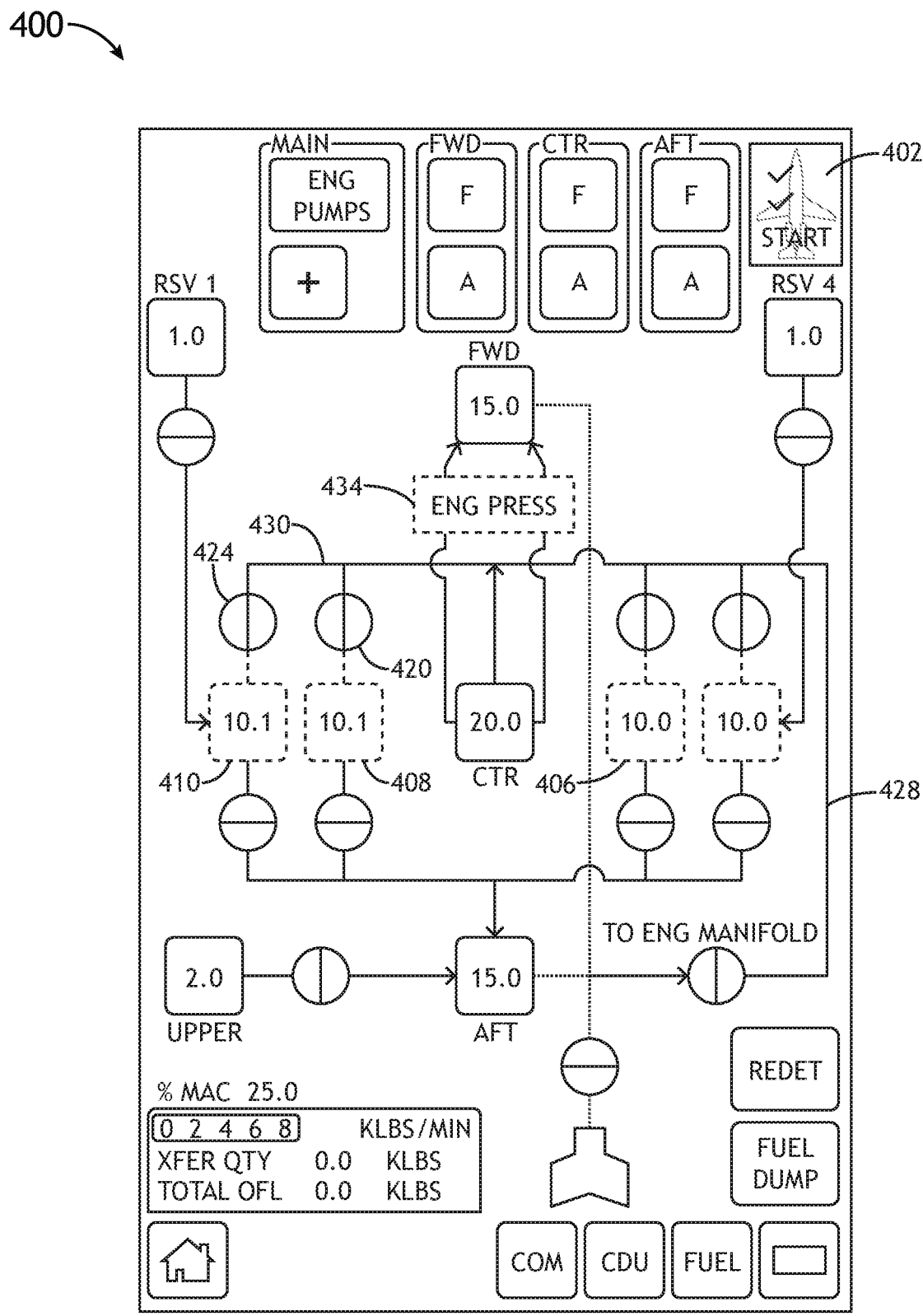
FIG. 4C shows a screen displayed by a touch screen fuel panel during a sequence according to an exemplary embodiment.
Figure 4D:
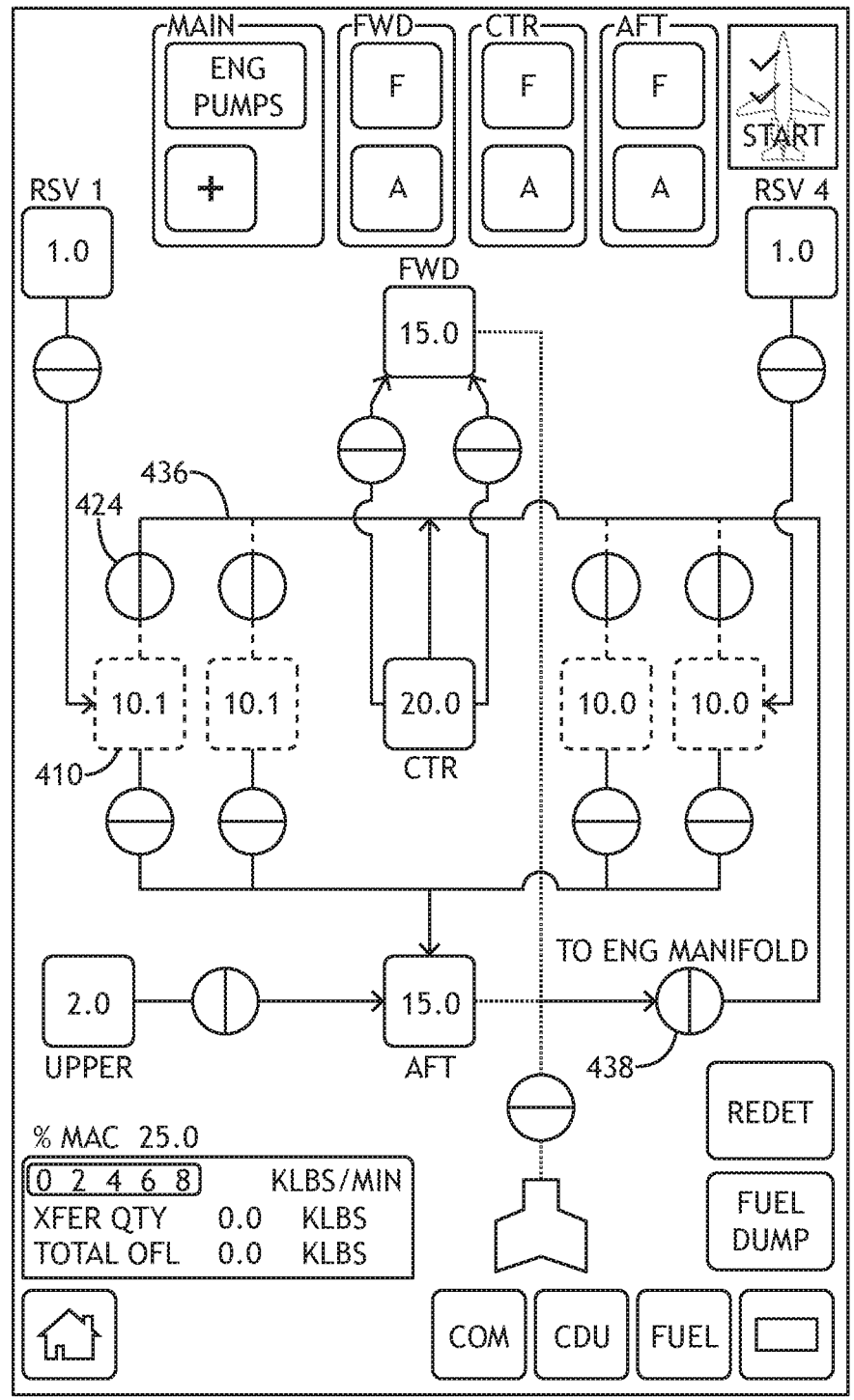
FIG. 4D shows a screen displayed by a touch screen fuel panel during a sequence according to an exemplary embodiment.
Figure 4E:
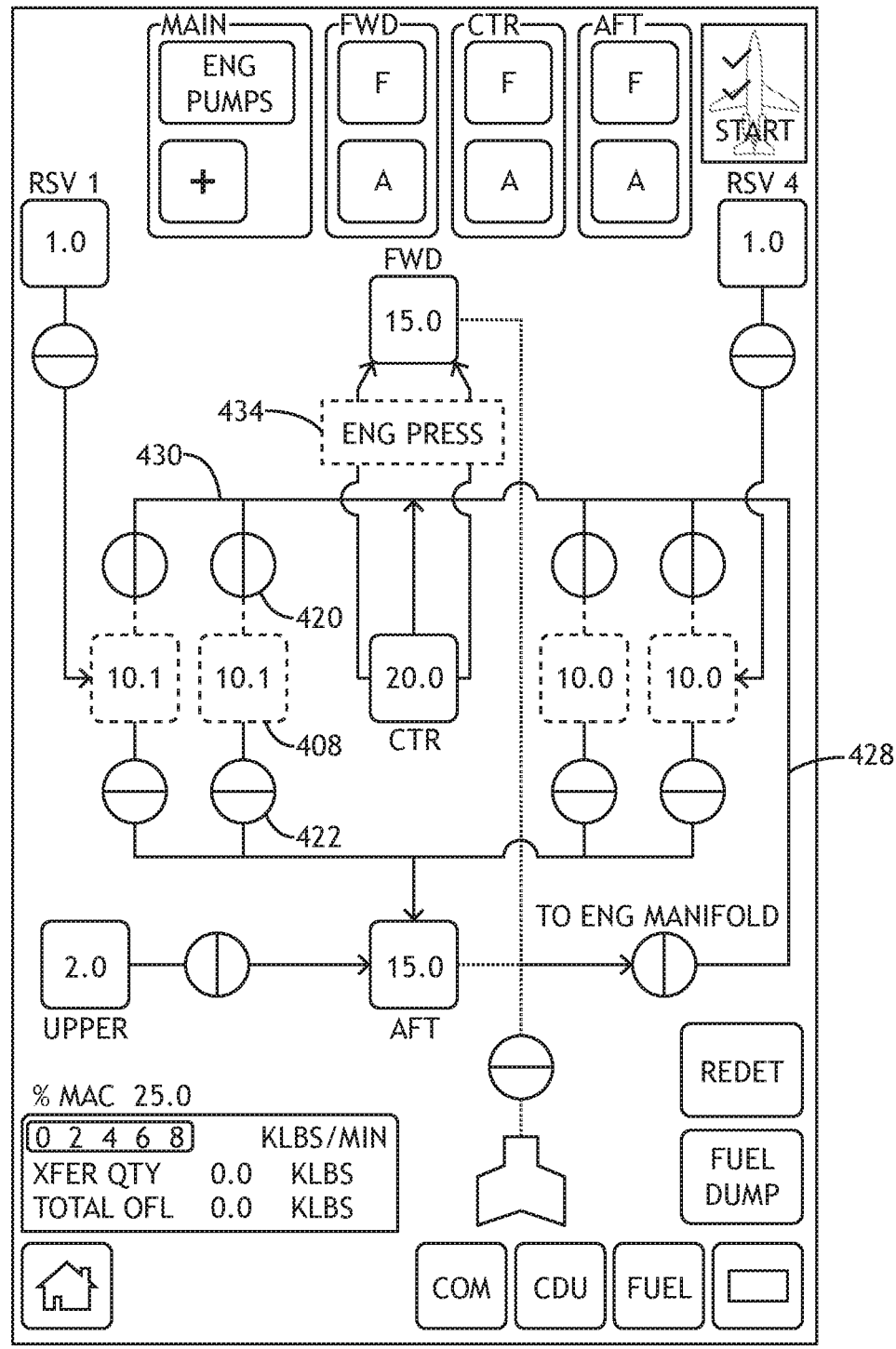
FIG. 4E shows a screen displayed by a touch screen fuel panel during a sequence according to an exemplary embodiment.
Figure 4F:
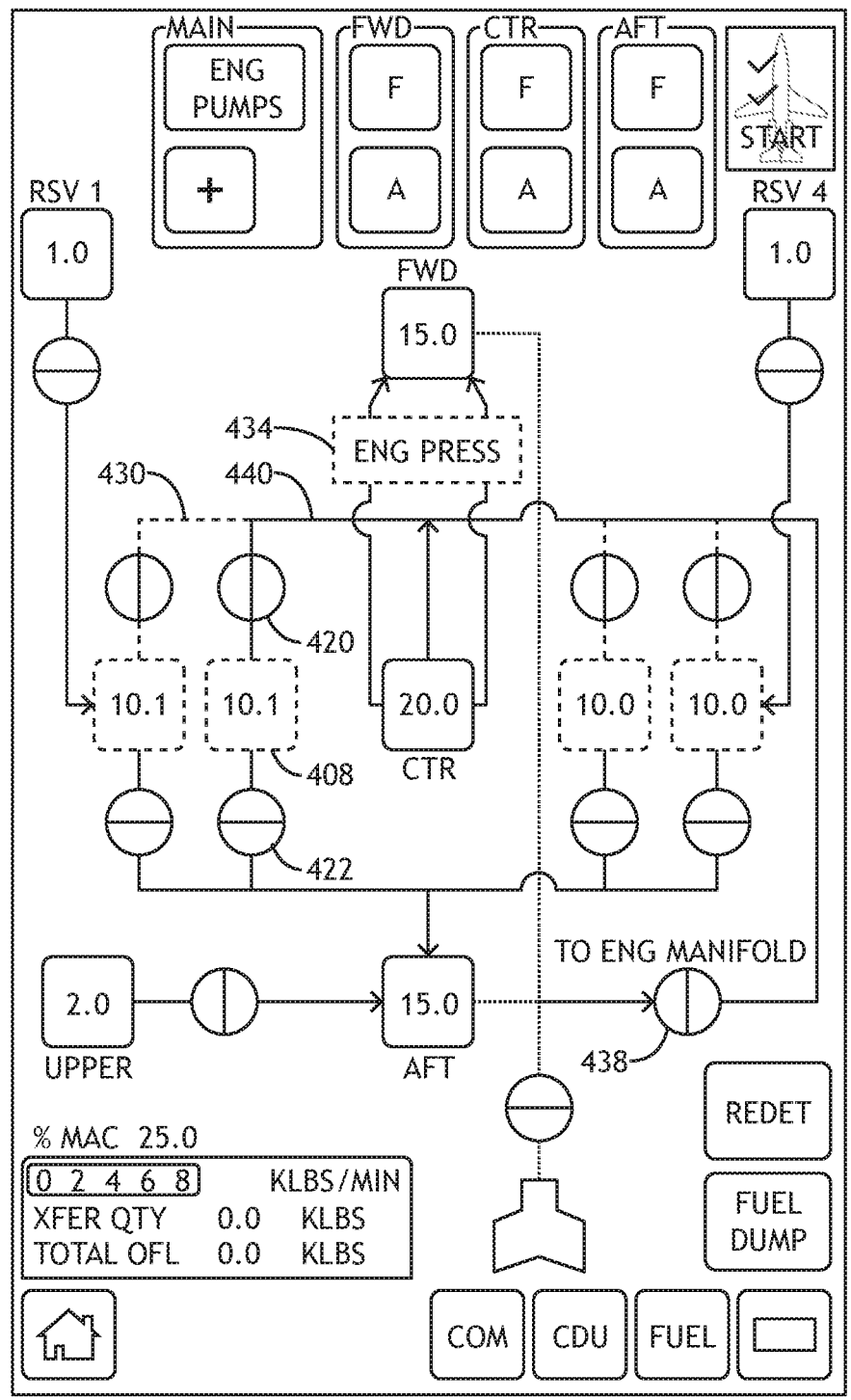
FIG. 4F shows a screen displayed by a touch screen fuel panel during a sequence according to an exemplary embodiment.
Figure 4G:
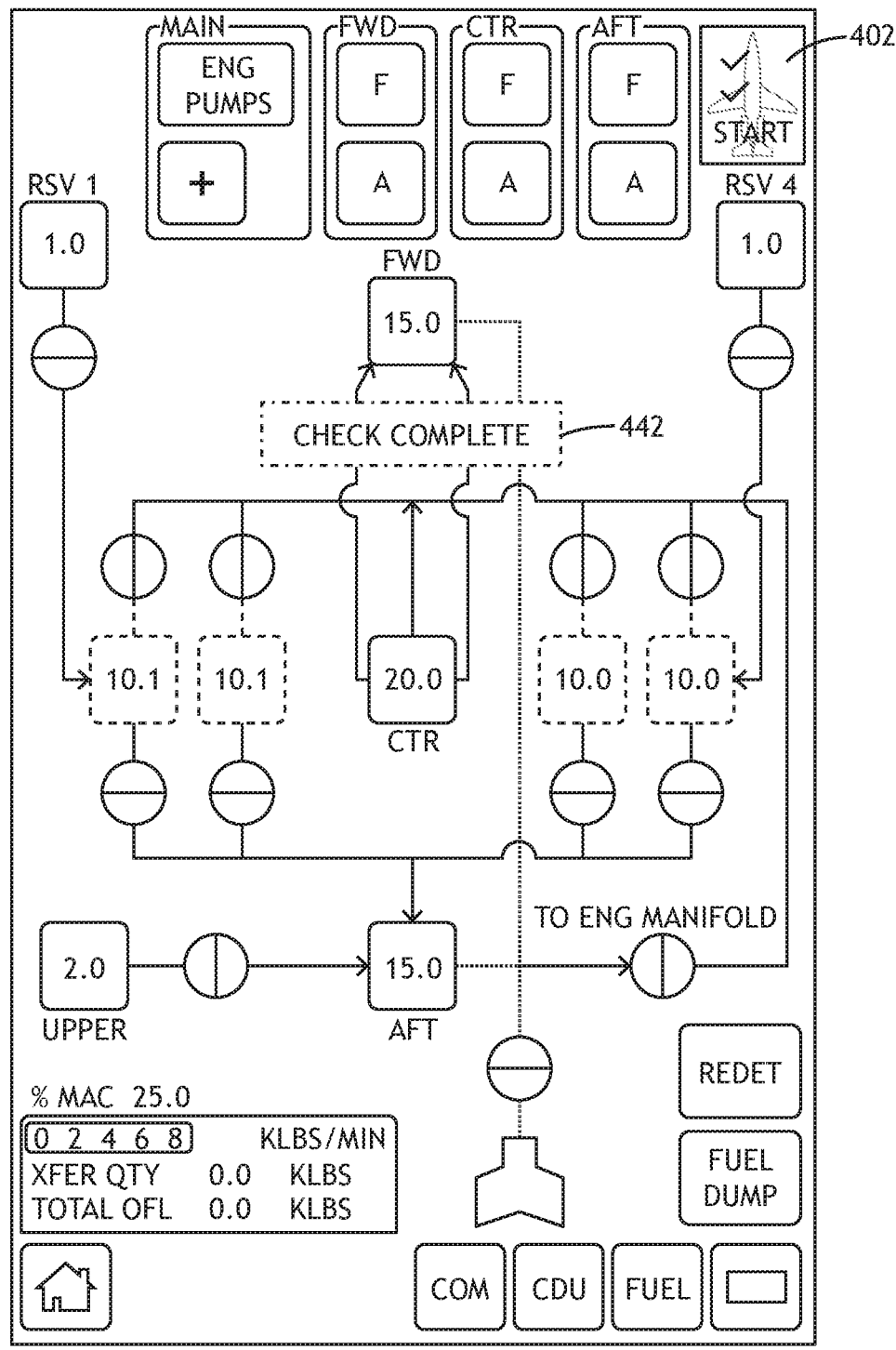
FIG. 4G shows a screen displayed by a touch screen fuel panel during a sequence according to an exemplary embodiment.
Figure 4H:
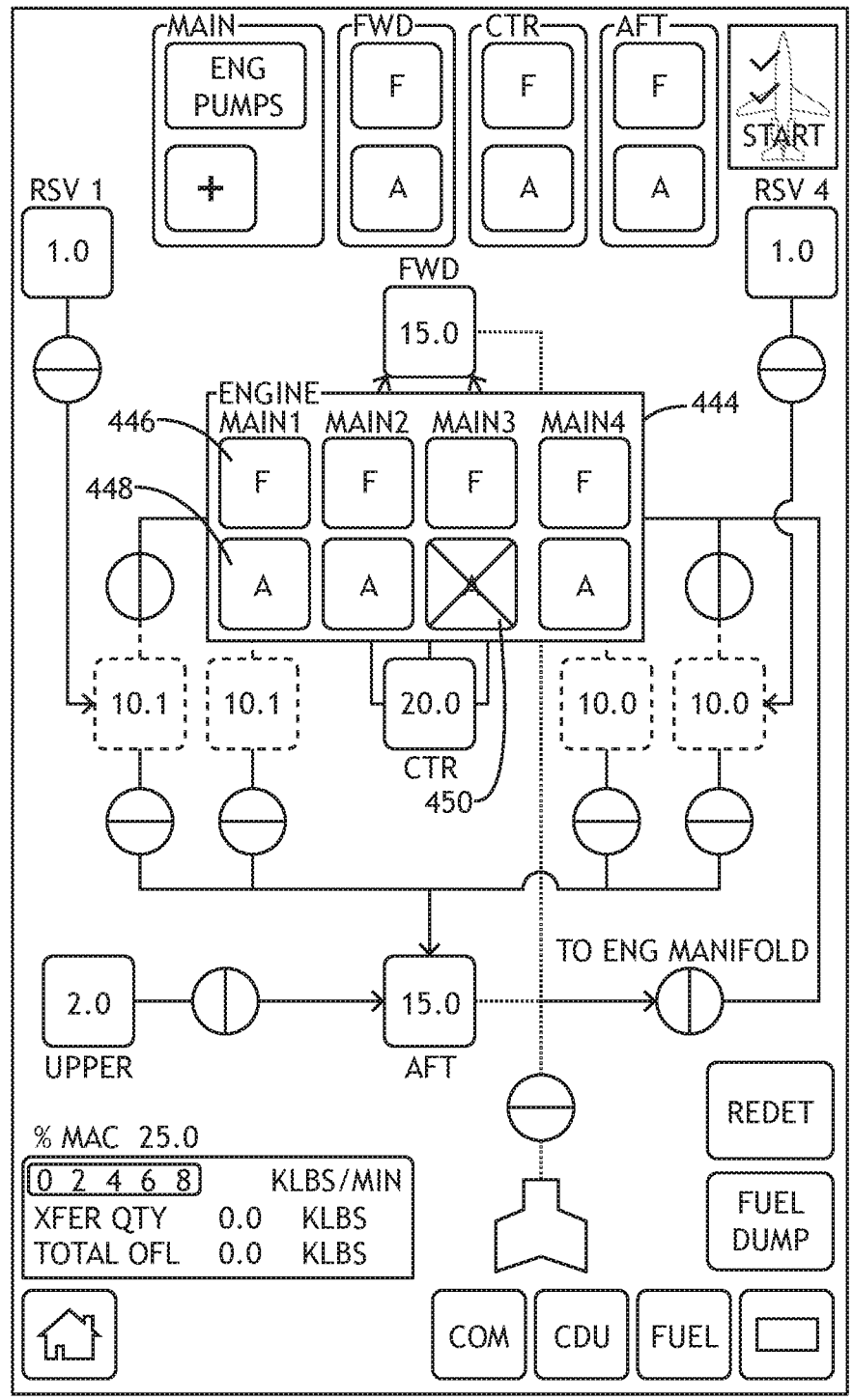
FIG. 4H shows a screen displayed by a touch screen fuel panel during a sequence according to an exemplary embodiment.

Referring to FIG. 3, a block diagram of a system 300 for implementing a touchscreen fuel panel according to an example embodiment is shown. The system 300 includes a controller 302 in data communication with a touchscreen 304 and a memory 306 for storing processor executable code. The controller 302 populates the touchscreen 304 with a graphical depiction of an aircraft fuel system.

In at least one embodiment, the system 300 includes an interface device 308 in data communication with the controller 302. The interface device 308 allows the controller 302 to interact with avionics systems to retrieve real-time data for display and send instructions to those avionics systems. Furthermore, the controller 302 may query the avionics systems via the interface device 308 to determine an architecture of the fuel system (numbers of tanks, pumps, valves, etc.). The controller 302 may then create a graphical representation of the fuel system as it actually exists. The controller 302 may also query the avionics systems to determine acceptable status boundaries for the depicted systems and store those status boundaries in the memory 306.

The controller 302 provides processing functionality for at least the touchscreen fuel panel 300 and can include any number of processors, micro-controllers, circuitry, field programmable gate array (FPGA) or other processing systems. In at least one embodiment, the controller 302 is in data communication with a data storage element for storing checklist procedures and checklist results when such procedures are executed. The controller 302 can execute one or more software programs embodied in a non-transitory computer readable medium (e.g., memory 306) that implement techniques described herein. The controller 302 is not limited by the materials from which it is formed or the processing mechanisms employed therein and, as such, can be implemented via semiconductor(s) and/or transistors (e.g., using electronic integrated circuit (IC) components), and so forth.

The memory 306 can be an example of tangible, computer-readable storage medium that provides storage functionality to store various data and/or program code associated with operation of the controller 302 and touchscreen 304, such as software programs and/or code segments, or other data to instruct the controller 302, and possibly other components of the touchscreen fuel panel 300, to perform the functionality described herein. Thus, the memory 306 can store data, such as a program of instructions for operating the touchscreen fuel panel 300, including its components (e.g., touchscreen display 304, controller 302, interface device 308, etc.), and so forth. It should be noted that while a single memory 306 is described, a wide variety of types and combinations of memory (e.g., tangible, non-transitory memory) can be employed. The memory 306 can be integral with the controller 302, can comprise stand-alone memory, or can be a combination of both. Some examples of the memory 306 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The interface device 308 can be operatively configured to communicate with components of the touchscreen fuel panel 300. For example, the interface device 308 can be configured to retrieve data from fuel sensors, pumps, valves, actuators, other aircraft sensors and/or actuators, the flight management system, and/or any other aircraft controllers or data sources, transmit data for storage in the memory 306, retrieve data from storage in the memory 306, and so forth. The interface device 308 can also be communicatively coupled with the controller 302 to facilitate data transfer between components of the touchscreen fuel panel 300 and the controller 302. It should be noted that while the interface device 308 is described as a component of the touchscreen fuel panel 300, one or more components of the interface device 308 can be implemented as external components communicatively coupled to the touchscreen fuel panel 300 via a wired and/or wireless connection. The touchscreen fuel panel 300 can also include and/or connect to one or more input/output (I/O) devices (e.g., via the interface device 308), such as the touchscreen 304, another input device (e.g., a mouse, a trackball, a trackpad, a joystick, a line select device, a touchpad, a keyboard, a keypad, a microphone (e.g., for voice commands), etc.), another output device (e.g., a speaker, a display, a status light, etc.), and so forth. In embodiments, the interface device 308 includes or is coupled to a transmitter, receiver, transceiver, physical connection interface, or any combination thereof.

Referring to FIGS. 4A-4H, screens 400 displayed by a touch screen fuel panel during a checklist sequence according to an exemplary embodiment are shown. Fuel panel operational status checks are performed by pilots prior to takeoff. Manual checklists introduce human error and increases pilot workload, particularly when using a manually controlled fuel panel. The touchscreen fuel panel described herein provides status feedback for manifold, pump, and valve control which can be automated and result in status summary for operators (e.g., pilots or other flight crew). For example, pump, valve, fuel quantity, and probe accuracy may be checked prior to takeoff. Having control of pumps and valves using the disclosed touchscreen fuel panel allows automation of checklist procedures used to confirm fuel panel operation. Moreover, the graphical user interface (GUI) presented by the touchscreen fuel panel adds situational awareness and provides flight crew with a fuel panel status log upon completion of the checklist procedures. Such log may be automatically offloaded via a ground control or flight control data connection.

A pilot or other crew member may select a checklist button 402 to initiate a checklist procedure. In at least one embodiment, a processor or controller configured for interaction via the screen 400 may determine a phase of a flight via data communication with other avionics systems, and automatically retrieve a checklist appropriate to the flight phase.

In at least one embodiment, a checklist procedure may include steps for checking the status of system valves 412, 414, 416, 418, 420, 422, 424, 426, the status of fuel reservoirs 404, 406, 408, 410, and associated fore and aft fuel pumps. While executing a checklist procedure, a processor may update, in real-time, a graphical depiction of one or more system valves 412, 414, 416, 418, 420, 422, 424, 426; for example, when testing fuel pumps associated with the fuel reservoirs 404, 406, 408, 410, a set of valves 412, 416, 420, 424 may be transitioned from a closed state (as in FIG. 4A) to an open state (as in FIG. 4B).

In at least one embodiment, components being actively tested are rendered with a visual indication. For example, fuel reservoirs 404, 406, 408, 410 may be rendered in a different color while the corresponding fuel pumps are being tested. Furthermore, fuel lines 428, 430 may be rendered in a different color while being tested. In at least one embodiment, the fuel lines 428, 430 may also be rendered with a graphical representation of fuel flow; for example, with moving or animated dashed lines to indicate a flow direction. Likewise, the speed of such moving dashed line may correspond to a flow rate. Fuel flow through particular system valves 412, 414, 416, 418, 420, 422, 424, 426 may be indicated by extending the graphical representation of the fuel lines 428, 430 to the currently testing system valve 412, 414, 416, 418, 420, 422, 424, 426, but not to other system valves 412, 414, 416, 418, 420, 422, 424, 426.

In at least one embodiment, each phase of a checklist procedure may be indicated via an overlay 432, 434, either currently executing or preparing to execute. For example, as the checklist procedure begins, a "CHECK INITIATED" overlay 432 may be rendered. It at least one embodiment, aspects of the checklist procedure may be color coded; for example, the "CHECK INITIATED" overlay 432 may be rendered in yellow while later overlays 432, 434, such as an "ENG PRESS" overlay 434, may be rendered in red.

In at least one embodiment, as checklist procedures progress, each step is rendered with real-time representations of the procedure and any real-time attainable feedback such as system valve 412, 414, 416, 418, 420, 422, 424, 426 positions, pump operations, flow rate, flow path, etc. For example, referring to FIG. 4D, a flow path 436 from a first fuel reservoir 410, through a first system valve 424, to an engine manifold valve 438 may be highlighted to indicate the path and components being tested. Between checklist procedure steps, a new overlay 434 indicating the next procedure step is rendered, followed by a rendering of the checklist procedure steps such as in FIG. 4F; a flow path 440 from a second fuel reservoir 408, through a second system valve 420, to an engine manifold valve 438 is highlighted to indicate the path and components being tested, excluding a portion of the fuel line 430 not included in the current procedure.

After all checklist procedures are complete, a "CHECK COMPLETE" overlay 442, possible rendered in color or style different from other overlays 432, 434. A final checklist status overlay 444 is generated indicating fore and aft fuel pumps 446, 448 that passed the checklist procedures and any faulty fuel pumps 450 that failed the checklist procedures.

In at least one embodiment, either the final checklist overlay 444 or various component representations may be selectable such that a user may access a historical summary of the checklist status of such component. Furthermore, components may be rendered in a color or style indicative of routine or periodic component failure based on historical checklist status.

Although specific fuel management checklist procedures have been described herein and/or illustrated in the drawings, the controller can be alternatively or additionally configured to execute other automated sets of checklist procedures, for example, any type of pre-flight, in-flight, taxi/takeoff/landing (TTL), and/or post-flight procedures. The controller can also send control signals to fuel/engine systems (e.g., pumps, system valves 412, 414, 416, 418, 420, 422, 424, 426, etc.) based on user inputs, user-selected or prescheduled control procedures, preprogrammed rules, or a combination thereof.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
at least one processor;
an avionics system interface in data communication with the processor;

a touchscreen display connected to the processor; and
a memory in data communication with the processor storing processor executable code for configuring the at least one processor to:
establish a data connection with one or more components in an avionics fuel system;
query one or more avionics systems via the avionics system interface;
determine a fuel system architecture and status boundaries based on data from the query;
render the fuel system architecture;
determine a current flight phase via data communication with the one or more avionics systems;
determine a set of checklist procedures corresponding to the current flight phase;
retrieve a checklist procedure from the set of checklist procedures;
receive an input corresponding to a checklist step;
retrieve historical data corresponding to previous checklist procedure executions;
render the historical data as an overlay with distinct color variations corresponding to historic routine or periodic component failures;
iteratively render an indication of each checklist step;
iteratively render a graphical representation of each checklist step,
including:
animating at least one valve rotation;
animating a path and direction of a fuel flow through a system valve;
representing a flow rate via a speed of moving dashed lines; and
extending a graphical representation of corresponding fuel lines to a currently testing system valve,
wherein each system element involved in a current checklist step in a distinct color; and
iteratively render a graphical representation of real-time feedback of one or more system responses to each checklist step.

2. The computer apparatus of claim 1, wherein the processor executable code further configures the at least one processor to render a graphical representation of a status of each checklist step.

3. The computer apparatus of claim 1, wherein system elements that have failed a previous checklist step are rendered in a distinct color.

4. The computer apparatus of claim 1, wherein the processor executable code further configures the at least one processor to:
automatically store an output of the checklist procedure; and
automatically send the output to a communication system via the avionics system interface for transmission to a flight controller.

5. An aircraft fuel management system comprising:
at least one processor;
an avionics system interface in data communication with the processor;
a touchscreen display connected to the processor; and
a memory in data communication with the processor storing processor executable code for configuring the at least one processor to:
establish a data connection with one or more components in an avionics fuel system;
query one or more avionics systems via the avionics system interface;
determine a fuel system architecture and status boundaries based on data from the query;
render the fuel system architecture;
determine a current flight phase via data communication with the one or more avionics systems;
determine a set of checklist procedures corresponding to the current flight phase;
retrieve a checklist procedure from the set of checklist procedures;
receive an input corresponding to a checklist step;
retrieve historical data corresponding to previous checklist procedure executions;
render the historical data as an overlay with distinct color variations corresponding to historic routine or periodic component failures;
iteratively render an indication of each checklist step;
iteratively render a graphical representation of each checklist step,
including:
animating at least one valve rotation;
animating a path and direction of a fuel flow through a system valve;
representing a flow rate via a speed of moving dashed lines; and
extending a graphical representation of corresponding fuel lines to a currently testing system valve, wherein each system element involved in a current checklist step in a distinct color; and
iteratively render a graphical representation of real-time feedback of one or more system responses to each checklist step.

6. The aircraft fuel management system of claim 5, wherein the processor executable code further configures the at least one processor to render a graphical representation of a status of each checklist step.

7. The aircraft fuel management system of claim 5, wherein the processor executable code further configures the at least one processor to:
receive an input corresponding to a component being tested during the checklist step; and
render the component and one or more sub-elements of the component according to corresponding checklist steps.

8. The aircraft fuel management system of claim 5, wherein the processor executable code further configures the at least one processor to:
automatically store an output of the checklist procedure; and
automatically send the output to a communication system via the avionics system interface for transmission to a flight controller.

* * * * *